(12) United States Patent
Bluhm et al.

(10) Patent No.: US 6,910,859 B2
(45) Date of Patent: Jun. 28, 2005

(54) DOUBLE-WALLED ANNULAR ARTICLES AND APPARATUS AND METHOD FOR SIZING THE SAME

(75) Inventors: Gerald Bluhm, Milwaukie, OR (US); James R. Barrett, Milwaukie, OR (US)

(73) Assignee: PCC Structurals, Inc., Portland, OR (US)

( * ) Notice: Subject to any disclaimer, the term of this patent is extended or adjusted under 35 U.S.C. 154(b) by 131 days.

(21) Appl. No.: 10/387,897

(22) Filed: Mar. 12, 2003

(65) Prior Publication Data

US 2004/0179939 A1 Sep. 16, 2004

(51) Int. Cl.$^7$ ................................................ F01D 9/00
(52) U.S. Cl. ................................ 415/191; 415/208.2
(58) Field of Search ........................ 415/1, 191, 208.2; 72/370.14, 370.15

(56) References Cited

U.S. PATENT DOCUMENTS

| | | | |
|---|---|---|---|
| 3,636,609 A | * | 1/1972 | Stahl ............................ 269/37 |
| 3,834,013 A | | 9/1974 | Gerstle |
| 4,074,560 A | | 2/1978 | Sisk |
| 4,141,124 A | * | 2/1979 | Ryan ........................ 29/889.1 |
| 4,145,908 A | | 3/1979 | Miller |
| 4,592,537 A | | 6/1986 | Pfaffmann et al. |
| 4,989,433 A | | 2/1991 | Harmon et al. |
| 5,058,411 A | | 10/1991 | Siemers et al. |
| 5,190,603 A | | 3/1993 | Nazmy et al. |
| 5,232,340 A | | 8/1993 | Morgan |
| 5,277,045 A | | 1/1994 | Mahoney et al. |
| 5,299,353 A | | 4/1994 | Nazmy et al. |
| 5,836,197 A | * | 11/1998 | McKee et al. ................ 72/402 |
| 6,202,302 B1 | | 3/2001 | Descoteaux |

FOREIGN PATENT DOCUMENTS

| | | |
|---|---|---|
| EP | 0 457 561 A2 | 11/1991 |
| WO | WO 84/03851 | 10/1984 |

* cited by examiner

Primary Examiner—Ninh H. Nguyen
(74) Attorney, Agent, or Firm—Klarquist Sparkman LLP

(57) ABSTRACT

An embodiment of a disclosed apparatus for sizing an engine stator has a plurality of radially moveable shoes for engaging the inner and outer rings of the stator. The shoes apply a radially directed force to the inner and outer rings to cause the rings to expand. In particular embodiments, one or more heating mechanisms, such as a ceramic heating blanket, may be used to heat the stator prior to sizing. A method for sizing an engine stator also is disclosed. The method comprises simultaneously displacing the inner and outer rings of the stator generally radially outwardly so as to increase the respective diameters of the inner and outer rings.

69 Claims, 7 Drawing Sheets

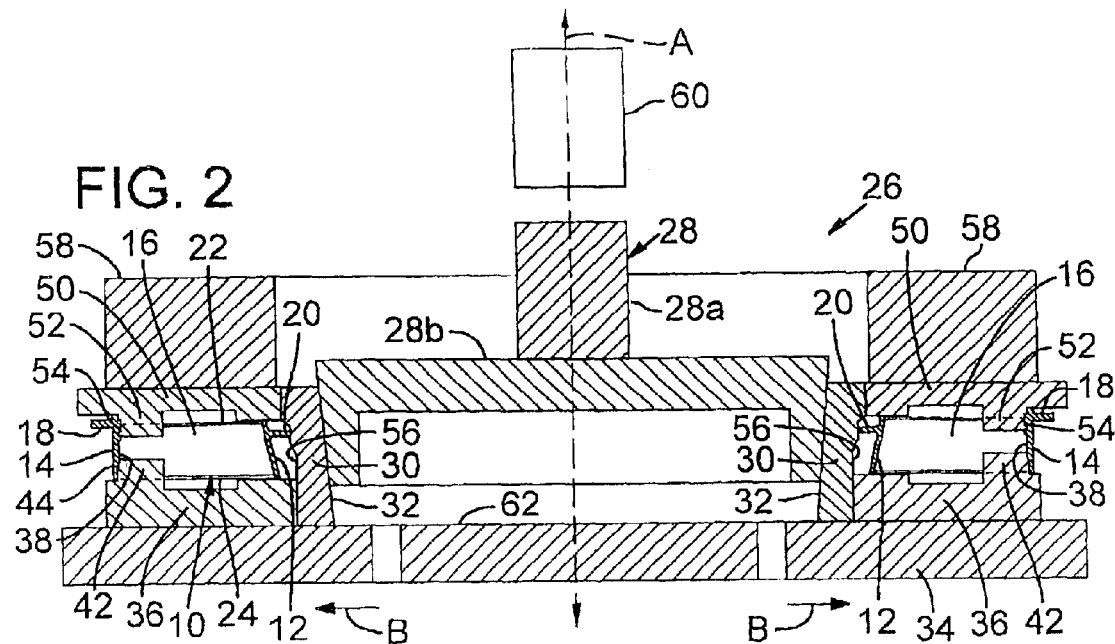
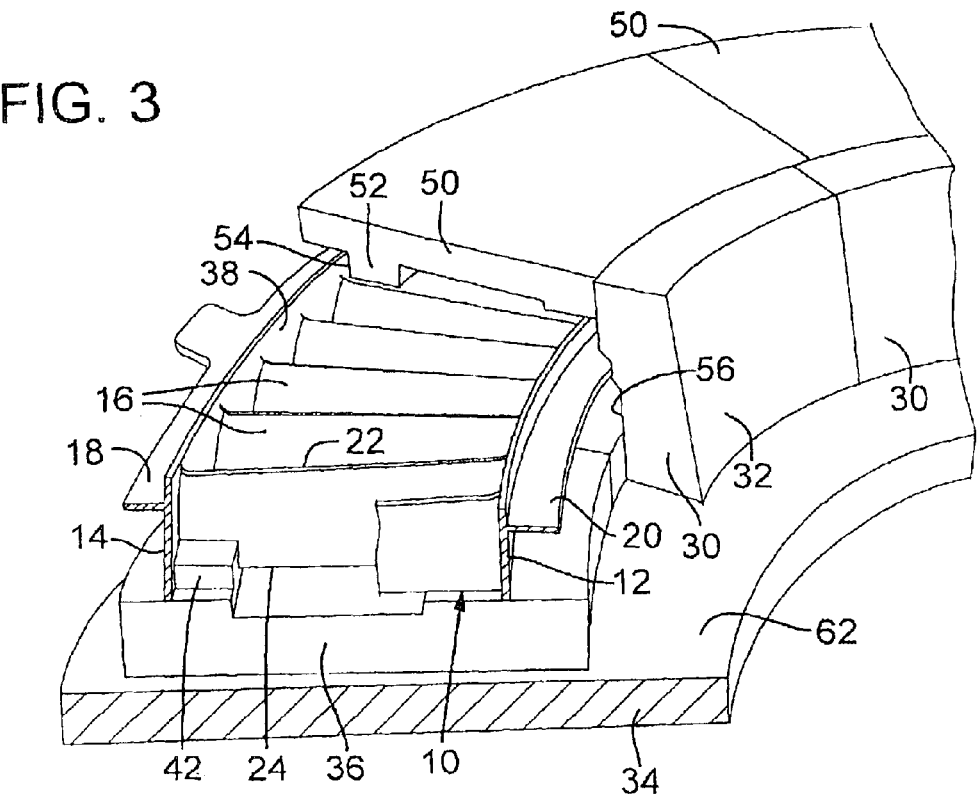

DOUBLE-WALLED ANNULAR ARTICLES AND APPARATUS AND METHOD FOR SIZING THE SAME

FIELD

The present invention relates generally to double-walled annular articles, such as engine stators (e.g., titanium and titanium alloy stators used in jet engines), and embodiments of an apparatus and method for sizing such articles using mechanical expansion.

BACKGROUND

A conventional gas turbine engine, such as is used in a jet aircraft, typically includes a turbine having alternating rows of stators and rotors. The stators, also referred to as stator nozzles, generally include a plurality of circumferentially spaced stator vanes that direct combustion gasses to the rotor stage immediately aft of the stator. The stator vanes are joined to an inner ring and at least one concentric outer ring so that the entire assembly comprises an inner ring and an outer ring with vanes extending therebetween.

For some high precision applications, such as for jet engines, the stators must be manufactured such that the diameters of the stator rings are within a specified tolerance. In some applications, for example, the diameters of the stator rings must be within a tolerance of two hundredths of an inch. However, when a stator is cast, the dimensions of its inner and outer rings are not always within the required tolerance range. Thus, an apparatus and method for sizing the stator to meet the required tolerance range is necessary.

Mechanical expansion has been used to size single-walled annular parts, such as the casing of a jet engine. Typically, such parts are made from sheet metal and therefore have generally smooth inside surfaces. One prior art apparatus for sizing such parts through mechanical expansion includes a conical plunger and a plurality of radially moveable shoes positioned around the plunger adjacent the inside surface of the annular wall of the part. To expand the part, the bottom of the plunger is pulled downwardly through the shoes, which causes the shoes to move radially outwardly with respect to the plunger against the wall of the part, thereby expanding the wall. The shoes may include electro-heaters for heating the part prior to expansion so that the part is more easily deformed.

However, apparatuses known for mechanically expanding a sheet-metal part are not suitable for sizing precision cast jet-engine stators. The complex geometric shape of a precision cast stator makes sizing such part, without adversely affecting its shape and size, much more difficult than sizing a single-walled sheet metal part devoid of vanes. For example, applying a radially directed force on the inner ring of a stator using known mechanical expansion techniques can cause undesirable deformation (e.g., buckling) or even failure of the stator vanes.

Accordingly, a need exists for an apparatus for accurately sizing engine stators and other double-walled parts, and methods for their use.

SUMMARY

To this end, the present invention provides embodiments of an apparatus and method for sizing multi-walled parts to within specified tolerances using mechanical expansion. The apparatus and method has particular applicability to sizing parts having complex geometries, such as engine stators.

In one representative embodiment, an apparatus for sizing a stator includes a plurality of radially moveable shoes for engaging the inner and outer rings of the stator. At least some of the shoes are moveable radially outwardly to engage the inner ring of the stator, and therefore expand the inner ring. In addition, at least some of the shoes are moveable radially outwardly to engage the outer ring of the stator, and therefore expand the outer ring as the inner ring is expanded.

In particular embodiments, the apparatus includes a plurality of generally wedge-shaped inner shoes positioned around a centrally located tapered cone. A first and second set of outer shoes are positioned radially outwardly from the inner shoes. Axial movement of the tapered cone causes the inner shoes to move radially outwardly, which in turn causes the first and second set of outer shoes to move radially outwardly.

In one disclosed embodiment, the first and second sets of outer shoes are configured to engage the outer ring at axially opposing ends (e.g., the forward and aft ends) of the stator, and the inner shoes are configured to engage the inner ring or an inner flange of the inner ring. Thus, in this embodiment, the first and second set of shoes serve to expand the outer ring and inner shoes serve to move the outer shoes and expand the inner ring.

In another disclosed embodiment, the first set of outer shoes is configured to engage both the outer ring and the inner ring, and the second set of shoes is configured to engage the outer ring. Thus, radial movement of the first set of outer shoes against the inner ring causes the inner ring to expand, and radial movement of the first and second sets of outer shoes against the outer ring at opposing ends thereof causes the outer ring to expand. In this embodiment, the inner shoes engage the outer shoes for causing radial movement of the outer shoes, but the inner shoes do not necessarily contact the inner ring or any inner flange of the inner ring.

In another disclosed embodiment, the first set of outer shoes is configured to engage the outer ring and the second set of outer shoes is configured to engage the inner ring. Thus, radial movement of the first set of outer shoes against the outer ring causes the outer ring to expand and radial movement of the second set of shoes against the inner ring causes the inner ring to expand. As in the previous embodiment, the inner shoes engage both sets of outer shoes for causing radial movement of the outer shoes, but the inner shoes do not necessarily contact the inner ring or any flanges of the inner ring.

One or more annular dead-weight rings may be supported above the stator. The weight of the dead-weight rings bearing down on the stator assists in preventing deflection or deformation of the stator or portions of the stator in a non-radial direction. In addition, one or more heaters, such as ceramic heating blankets, may be used to heat the stator prior to sizing so that the stator is more easily deformed. Heated argon gas may be used in lieu of or in addition to the heating blankets for heating the stator.

In another representative embodiment, an apparatus for sizing a double-walled article has plurality of radially moveable wall-engaging segments. At least some of the wall-engaging segments are configured to move radially outwardly with respect to the article to engage an inner surface of the inner wall of the article, and therefore expand the inner wall. In addition, at least some of the wall-engaging segments are configured to move radially outwardly to engage an inner surface of the outer wall of the article, and therefore expand the outer wall.

A method is disclosed for sizing an article, such as an engine stator, having an inner ring, an outer ring and a plurality of circumferentially spaced vanes extending radially between the inner and outer rings. The method comprises displacing the first and second rings generally radially with respect to the axis so as to increase the respective diameters of the first and second rings.

In another embodiment, a method for sizing a double-walled article defining a central axis comprises moving a plurality of shoes generally radially outwardly with respect to the axis such that at least some of the plurality of shoes engage an inner surface of the inner wall of the article to displace the inner wall and at least some of the plurality of shoes engage an inner surface of the outer wall of the article to displace the outer wall.

In another embodiment, an article having an inner ring, an outer ring and a plurality of vanes extending between the first and second rings, is formed by a method comprising simultaneously displacing the inner and outer rings generally radially outwardly so as to increase the respective diameters of the inner and outer rings.

The foregoing and other features and advantages of the invention will become more apparent from the following detailed description of several embodiments, which proceeds with reference to the accompanying figures.

BRIEF DESCRIPTION OF THE DRAWINGS

FIG. 2 is a cross-sectional view of an apparatus, according to one embodiment, for sizing the stator shown in FIG. 1.

FIG. 3 is an enlarged, perspective view of a portion of the apparatus of FIG. 2, showing a portion of the stator, a support base, and inner shoes, bottom shoes, and top shoes for engaging the stator.

DETAILED DESCRIPTION

Introduction

Figure 1:
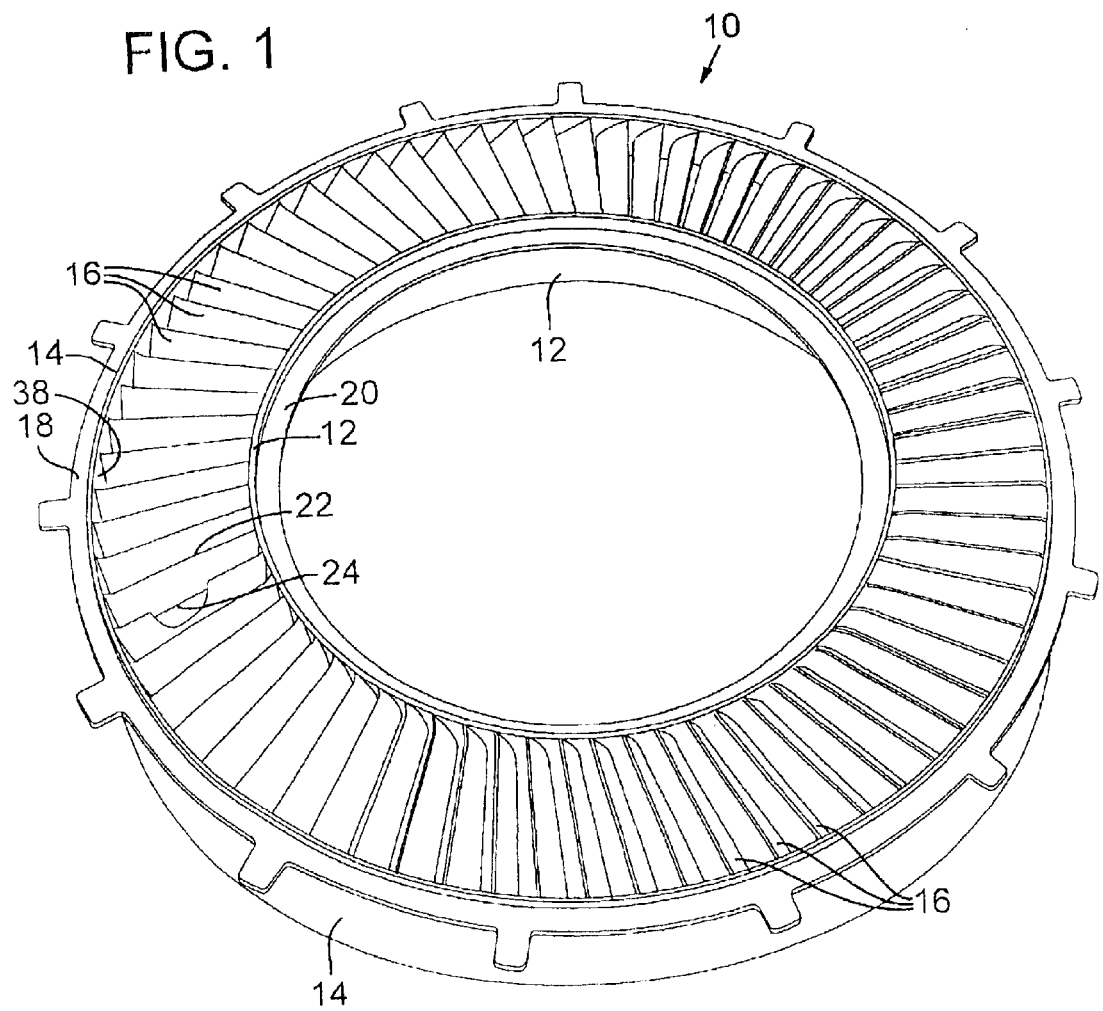
FIG. 1 is a perspective view of one embodiment of a stator.

One exemplary use of the embodiments of the apparatus and method described herein is for sizing a stator for a jet engine, such as the investment cast engine stator 10 illustrated in FIG. 1. Accordingly, by way of example, the following description proceeds with reference to sizing an engine stator. However, the described embodiments of the apparatus and method also can be used to size other articles, particularly similarly configured articles that generally comprise an inner ring, or wall, of a first diameter connected to a concentric outer ring, or wall, of a second diameter greater than the first diameter. Such articles include, without limitation, various components of a gas turbine engine assembly, such as a combustor liner, an intermediate casing, a half casing, and a front frame.

As used herein, the term "size" means to deform an article so that the article conforms to a desired shape and size, and more typically refers to increasing the size of at least a portion of the article by expansion.

Stator 10 of FIG. 1, which is representative of a stator that can be sized using the apparatus and methods of the present disclosure, includes an inner ring 12 (also known as an inner band) connected to a concentric outer ring 14 (also known as an outer band) by a multitude of radially extending vanes 16. Outer ring 14 includes an annular outer flange 18 and the inner ring 12 includes an annular inner flange 20. In the present disclosure, the flanges of a stator, whether integrally formed or separately formed and subsequently joined to the stator, are considered to be part of the stator ring from which they extend. Thus, in the present disclosure, to "engage" a stator ring means to engage the stator ring itself and/or a flange that extends from the ring. In the present disclosure, the term "ring" is used in a general sense to refer to a ring or annular wall of an article. For example, in the present disclosure, the term "ring" can be used in its traditional sense to refer to a ring or band of an engine stator (e.g., the inner and outer rings 12, 14, respectively, of stator 10 of FIG. 1), or to refer to a cylindrical or conical wall of a double-walled article (e.g., the inner and outer walls of a combustor liner).

Stator 10 includes a "forward" end 22 (the upwardly facing side of the stator when viewing FIG. 1) and an "aft" end 24 (the hidden or downwardly facing side of the stator when viewing FIG. 1). The terms "forward" and "aft" in the present disclosure refer to the ends of a stator in relation to upstream and downstream rotors in an engine assembly. In particular, the aft end of a stator is the end of the stator adjacent a downstream rotor, and the forward end of a stator is the end of the stator adjacent an upstream rotor. In the sizing apparatus embodiments described below and shown in FIGS. 2–10, stators are positioned in sizing apparatuses with their aft ends facing downwardly and their forward ends facing upwardly, although this is not a requirement.

The described embodiments of the apparatus and method can be used to size stators or other parts of any size. Typically, stators can range from about 4 to 16 feet in diameter. In particular embodiments, stator 10 has an outer diameter of about 37 inches. Engine stators, such as stator 10 of FIG. 1, typically are cast from Titanium or a Titanium alloy (e.g., Ti 6-4 alloy).

The described embodiments of the apparatus and method have particular applicability for sizing parts made from high temperature materials, such as any of various Nickel-, Iron-, Cobalt-, and Aluminum-based alloys.

First Representative Embodiment

FIG. 2 is a cross-sectional view of one embodiment of an apparatus, indicated generally at 26, for sizing the stator 10 of FIG. 1. Apparatus 26 includes a core portion 28, which in the illustrated configuration includes a top portion 28a connected to a bottom tapered cone portion 28b. Core portion 28 is movable in the axial direction along a central axis A.

Surrounding the core portion 24 and supported on a base 34 is a plurality of generally wedge-shaped inner segments, or shoes, 30 (FIGS. 2 and 3), which have respective inner surfaces 32 that are tapered to correspond to the taper of tapered cone 28b. Shoes 30 collectively form an expanding "sleeve" around tapered cone 28. Axial movement of core portion 28 toward base 34 causes shoes 30 to move radially outwardly with respect to axis A, as indicated by arrows B in FIG. 2.

As shown in FIGS. 2 and 3, a plurality of "outer" shoes, or wall-engaging segments, 36 (termed "outer" shoes because shoes 36 are positioned radially outwardly with respect to inner shoes 30) surround the inner shoes 30 and are supported on the base 34. With respect to the illustrated embodiment, shoes 36 also may be referred to as "bottom" shoes because they are situated below the stator 10.

In the illustrated embodiment, the stator 10 is positioned on top of shoes 36 with the aft end 24 of the stator positioned proximate the upper surface of shoes 26. However, in alternative embodiments, the apparatus 26 may be configured to receive a stator with its forward end positioned proximate the bottom shoes. In any event, shoes 36 are configured to move radially outwardly with respect to the central axis upon movement of shoes 30 to engage the inner surface 38 of outer ring 14 at the aft end 24 of stator 10.

Figure 4:
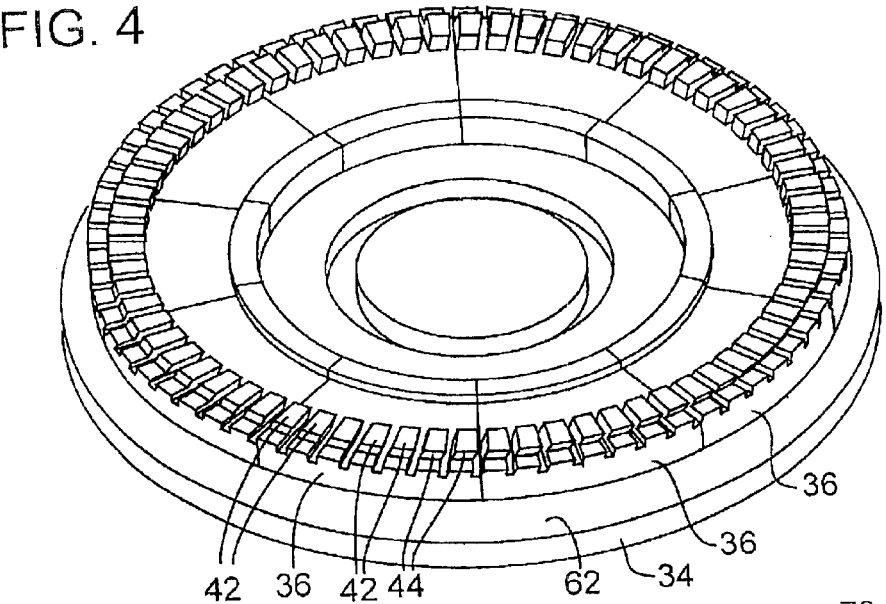
FIG. 4 is a top perspective view showing the bottom shoes and the base of the apparatus of FIG. 2.

As best shown in FIG. 4, the illustrated shoes 36 are angular segments that, when placed side-by-side collectively form an annular ring around the sleeve formed by shoes 30 (not shown). Each shoe 36 includes a plurality of upwardly extending, circumferentially-spaced projections 42 positioned and dimensioned to fit between adjacent pairs of vanes 16. The outer surfaces 44 of projections 42 desirably are contoured to the inner surface 38 of outer ring 14.

As shown in FIGS. 2 and 3, a plurality of outer shoes 50 are positioned over the forward end 22 of stator 10. With respect to the illustrated embodiment, shoes 50 may be referred to as "top" shoes since they are situated above the stator. Like shoes 36, shoes 50 surround shoes 30 in a side-by-side relationship with each other and are configured to move radially outwardly with respect to the central axis upon movement of shoes 30 to engage the inner surface 38 of outer ring 14 at the forward end 22 of stator 10. Shoes 50 also include a plurality of downwardly extending, circumferentially-spaced projections 52 positioned and dimensioned to fit between adjacent pairs of vanes 16. The outer surfaces 54 of projections 52 desirably are contoured to correspond to the inner surface 38 of outer ring 14.

As shown in FIG. 2, an annular dead-weight ring 58 is supported by top shoes 50. The weight of the dead-weight ring 58 bearing down on the stator 10 minimizes or prevents undesirable out-of-plane deformation of the stator as the stator is sized. Such out-of-plane deformation, as used herein, means any deformation or deflection of the stator or components of the stator in a non-radial direction, such as buckling, warping or bending. In working embodiments, ring 58 weighed about 500 lbs., which was suitable for sizing investment-cast Titanium or titanium-alloy stators weighing about 35 lbs. and having an outer diameter of about 37 inches. In alternative embodiments, two smaller dead-weight rings, each weighing, for example, about 250 lbs., are use instead of a one 500 lb. dead-weight ring. Where two dead-weight rings are used, one dead-weight ring desirably is positioned above the outer ring 14 and the other dead-weight ring desirably is positioned above the inner ring 12.

Shoes 30 have outer surfaces 56 configured to engage bottom shoes 36, top shoes 50, and the inner flange 20 of stator 10. In this manner, shoes 30 serve to translate axial movement of core portion 28 into movement of shoes 36 and shoes 50 in a generally outwardly radial direction (arrows B in FIG. 2) with respect to the central axis A and to apply a radially directed force to the inner ring 12 for expanding the inner ring 12.

In use, a force is applied to core portion 28, such as with a hydraulic press 60 (FIG. 2), to cause core portion 28 to move toward base 34, which in turn causes radial movement of shoes 30, shoes 36, and shoes 50. Upon such movement of shoes 36 and 50, projections 42 and 52 bear against inner surface 38 of outer ring 14 at opposite ends thereof to displace outer ring 14 radially outwardly. Simultaneously, shoes 30 bear against the inner flange 20 to displace the inner ring 12 radially outwardly. The core portion 28 is moved toward the base 34 until the desired dimensions for the inner and outer rings 12, 14 are obtained.

A suitable lubricant can be applied to selected surfaces of the apparatus 26 to minimize friction between contacting parts during sizing. For example, a lubricant can be applied to the upper surface 62 of the base 34 and/or the adjacent surfaces of shoes 36 to minimize sliding friction between the base 34 and shoes 36. Similarly, a lubricant can be applied to the inner surfaces 32 of shoes 30 and/or the adjacent surface of the tapered cone 28. In particular embodiments, a high-temperature lubricant, such as boron nitride, is used, although other types of lubricants also can be used.

Figure 5:
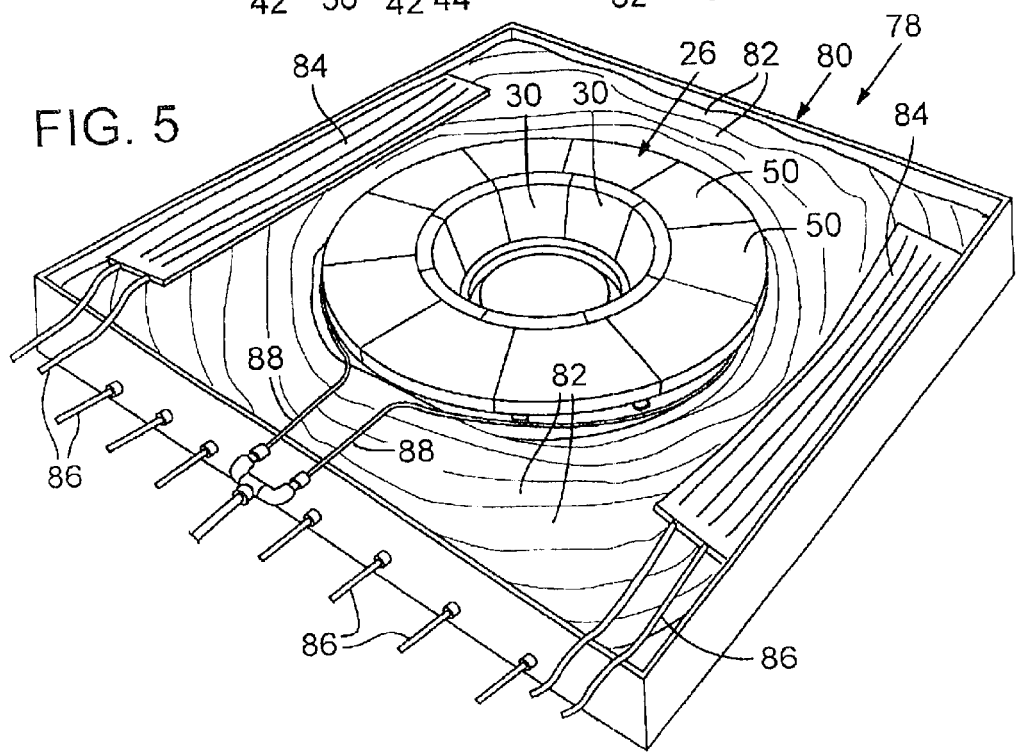
FIG. 5 is a top perspective view of an assembly comprising the apparatus of FIG. 2 and heating means for heating the stator.

FIG. 5 illustrates an assembly, indicated generally at 78, for heating a stator 10 prior to sizing. As shown, apparatus 26 is positioned in a container 80. Insulation 82 (e.g., Kaowool™ insulation, available from Thermal Ceramics, Inc. of Augusta, Ga.) may be placed in container 80 and may substantially surround apparatus 26. The top of the container 80, which is removed in FIG. 5 for the purpose of illustrating the components inside the container, is formed with a central opening through which the top portion 28a of core portion 28 (not shown in FIG. 5) extends.

One or more heaters, such as the illustrated ceramic heating blankets 84 having electrical cords 86, are placed in the container 80 to heat the stator prior to sizing. In the illustrated embodiment, heating blankets 84 are placed on top of insulation 82 proximate the top shoes 50 and below insulation 82 proximate base 34, the latter having cords 86 extending through the side wall of container 80. Suitable heating blankets are commercially available from Cooperheat, Ltd. of West Lancashire, U.K.

A gas conduit 88, which is fluidly connectable to a source of an inert gas (e.g., argon) (not shown), extends into the container 80 and surrounds the apparatus 26. The gas conduit 88 desirably has a plurality of openings along its length for introducing the inert gas into the container. The inert gas can be used to purge the atmosphere in the container 80 surrounding the stator 10 prior to heating and subsequent sizing of the stator 10. An inert gas typically is used if the part being sized is potentially oxidized at elevated temperatures in an oxygen-containing environment. Inert gas likely is not required for all metals or alloys for which parts are made requiring sizing using the disclosed embodiments of the present apparatus and method. Further, a heated inert gas (e.g., heated argon gas) can be introduced into the container 80 via gas conduit 88 for heating the stator 10. The heated gas can be used in lieu of or in addition to other types of heaters (e.g., heating blankets 84) used for heating the stator 10.

The various components of the apparatus 26, including core portion 28, base 34, shoes 30, shoes 36 and shoes 50, are made from any suitable materials. When heat treatment is used, shoes 30, shoes 36 and shoes 50 desirably are made from materials having a low coefficient of thermal expansion to minimize expansion of these parts when the stator is heated. By way of example, and not meant to limiting in any way, materials such as 321 and 349 stainless steel, Ni-based Haynes 230, and Ni-based RA 330 have proven to be suitable for working temperatures in the range of about 1,500° F. to about 1,700° F. and working pressures in the range of about 60,000 psi to about 90,000 psi.

Any suitable control system can be implemented to automatically control sizing of the stator. In a specific implementation, a position sensor (e.g., a Temposonics position sensor, available from MTS Systems Corp. of Cary, N.C.) is coupled to the hydraulic press 60 to measure axial displacement of the hydraulic press 60. The position sensor sends a signal corresponding to axial displacement of the press to a controller (e.g., a general purpose computer). The controller translates axial displacement of the press to radial displacement of the shoes, and therefore radial displacement of the inner and outer rings of the stator. The controller sends a feedback signal to the press to stop the press once the desired size of the stator is achieved. Data-acquisition software (e.g., DaqView Plus, available from Iotech, Inc. of Cleveland, Ohio) may be used to acquire, save and/or view data (e.g., data corresponding to displacement, time, pressure, etc.) in real time or from a data file.

A stator may be sized at ambient temperatures, or alternatively, at elevated temperatures to increase the elasticity of the stator, which in turn reduces the pressure required to size the stator. Heating the stator prior to sizing also reduces residual stresses in the stator after the stator is expanded. This is advantageous in that if the stator is machined following the sizing process to remove stress layers from the stator, the stator is less likely to move during the subsequent machining process. Stators in which the residual stresses have been reduced to at least 5 ksi have proven to be adequate for machining stress layers from stators following sizing.

Figure 11:
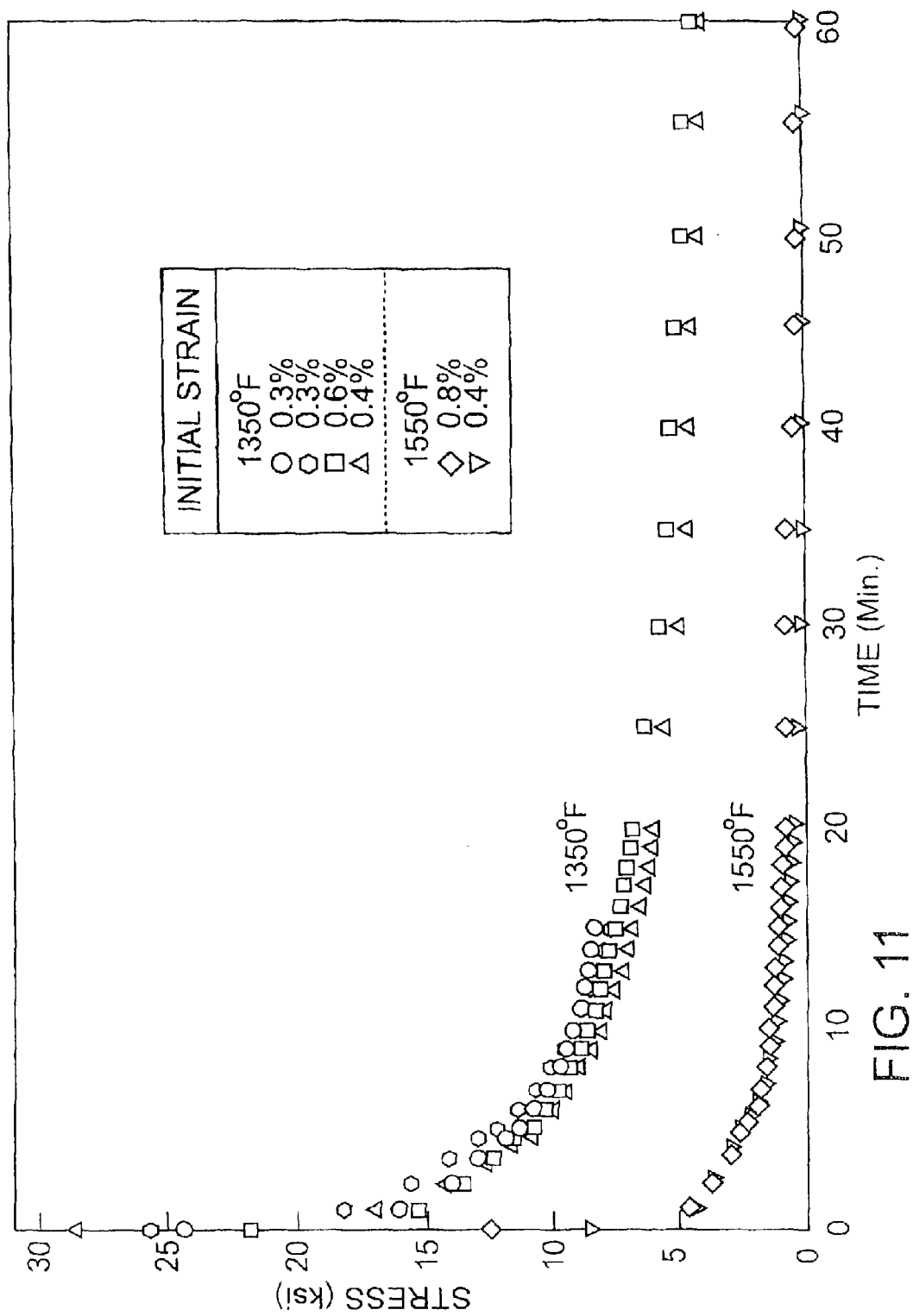
FIG. 11 shows several stress-relaxation curves for Ti 6-4 cast bars at 1350° F. and 1550° F.

Stress-relaxation curves for the material from which the stator is made can be used in selecting a suitable temperature and/or time for sizing the stator. FIG. 11, for example, shows several experimentally derived stress-relaxation curves for Ti 6-4 cast bars at 1350° F. and 1550° F. As shown, residual stresses in Ti 6-4 can be reduced to about 5–8 ksi at 1350° F. and to less than 1 ksi at 1550° F. Also, residual stresses are reduced much quicker at 1550° F. than at 1350° F. In particular embodiments, Ti 6-4 cast stators are heated to at least 1550° F. to ensure that residual stresses are reduced below 5 ksi.

Exemplary Method for Sizing a Stator

In one implementation, the assembly 78 of FIG. 5 is used to size a stator made from Ti 6-4 alloy and having the same general configuration as stator 10 of FIG. 1. With the stator positioned inside the container 80, the inside of the container is purged with argon gas. The stator is then heated with the heating blankets 84 for about 10 hours until the stator is heated to at least about 1,550° F. In lieu of or in addition to the heating blankets 84, heated argon gas at a temperature of about 1,700° F. to 1,800° F. may be introduced into the container 80 for heating the stator. When the desired stator temperature is achieved, a hydraulic press is used to apply about 60,000 psi of pressure to core portion 28 to expand the stator to its desired size. Using this approach, it is possible to achieve the desired dimensions for the stator to within a tolerance of two hundredths of an inch or less.

Second Representative Embodiment

Figure 6:
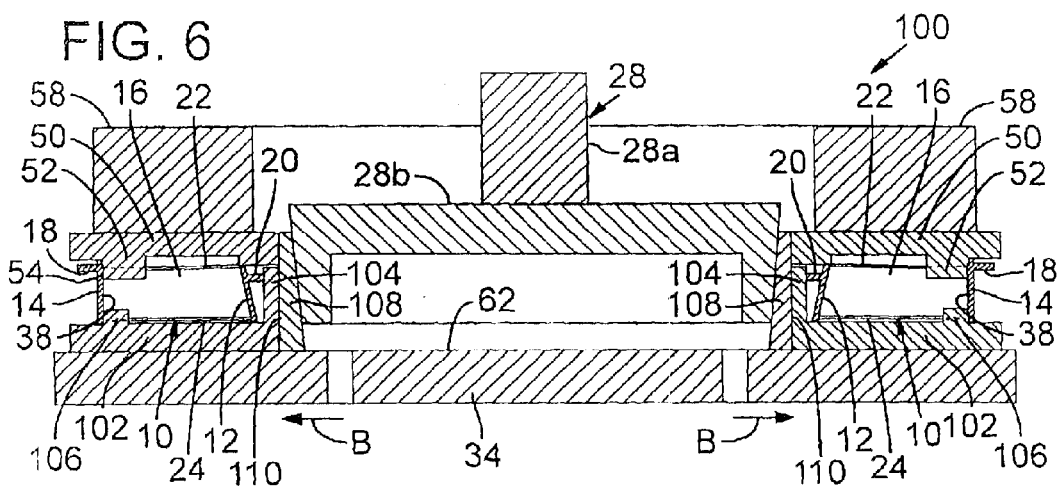
FIG. 6 is a cross-sectional view of another embodiment of an apparatus for sizing the stator shown in FIG. 1.

FIG. 6 illustrates an apparatus 100 according to another embodiment for sizing the stator 10 of FIG. 1. This embodiment shares many similarities with the embodiment of FIGS. 2–5. Hence, components in FIG. 6 that are substantially similar or identical to corresponding components in FIGS. 2–5 have the same respective reference numerals and are not described further.

One difference between apparatus 100 of FIG. 6 and apparatus 26 of FIGS. 2–6 pertains to the configuration of the bottom and inner shoes in each embodiment. Specifically, apparatus 100 includes a plurality of "bottom" shoes 102, which are substantially similar to bottom shoes 36 of apparatus 26, except that shoes 102 include upwardly extending heal portions 104 that are positioned to engage the inner flange 20 of the stator 10. Apparatus 100 also includes a plurality of inner shoes 108 having respective outer surfaces 110 that engage heal portions 104 and top shoes 50. Thus, in this embodiment, bottom shoes 102, not inner shoes 108, are configured to engage the inner flange 20 to expand the inner ring 12. Bottom shoes 102, like shoes 36, also include projections 104 configured to engage the inner surface 38 of outer ring 14 between adjacent pairs of vanes 16. Apparatus 100 can be operated in the manner described above in connection with apparatus 26 for sizing the stator 10.

In a modification of apparatus 100, the bottom shoes 102 can be provided with heal portions (not illustrated) configured to engage the inner ring 12 at a position below the inner flange 20. Also, the inner shoes 108 can be formed with an outer surface configured to engage a portion of the inner ring 12, such as inner flange 20, so that both the bottom shoes and the inner shoes engage the inner ring 12 (also not illustrated).

In another modification, the top shoes 50 can be formed with respective downwardly extending heal portions positioned to engage the inner ring 12 at the forward end of the stator 10 (not shown).

Third Representative Embodiment

Figure 7:
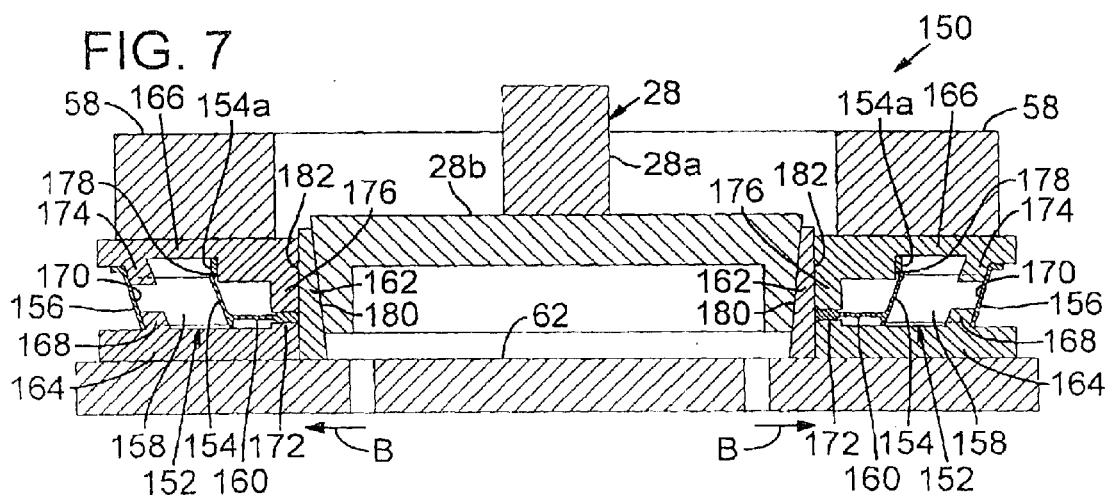
FIG. 7 is a cross-sectional view of another embodiment of an apparatus for sizing a second stator.

FIG. 7 illustrates an apparatus 150 for sizing a stator 152. Components in this embodiment that are substantially similar or identical to corresponding components of the embodiment shown in FIGS. 2–5 have the same respective reference numerals and are not described further.

Stator 152 is configured differently than stator 10. Stator 152 includes an inner ring 154, an outer ring 156, and a plurality of radially extending vanes 158 interconnecting the inner and outer rings 154, 156. An annular inner flange 160 extends radially inwardly from the inner ring 154. The inner ring 154 also includes a forward extension, or flange, 154a that extends axially from the forward end of inner ring 154.

Apparatus 150 includes a plurality of inner shoes 162, "bottom" shoes 164, and "top" shoes 166. Each bottom shoe 162 includes a plurality of circumferentially spaced projections 168 configured to engage the inner surface 170 of outer ring 156 between adjacent pairs of stator vanes 158. Each bottom shoe 162 also includes a heal portion 172 positioned to support the adjacent undersurface of the inner flange 160.

Each top shoe 166 includes a plurality of circumferentially spaced projections 174 configured to engage the inner surface 170 of outer ring 156 between adjacent pairs of stator vanes 158. Each top shoe 166 also is formed with a heal portion 176 and a stepped surface 178 spaced between projections 174 and heal portion 176. Heal portions 176 contact an adjacent upper surface of the inner flange 160 opposite heal portions 172. The inner flange 160 therefore is retained between heal portions 176 and heal portions 172 of the top and bottom shoes 166, 164, respectively, to avoid deflection or buckling of the inner flange 160 during sizing of the stator 152. Stepped surface 178 desirably conforms to the inner surface of flange 154a.

The inner shoes 162 have respective inner surfaces 180 tapered to correspond to the taper of the tapered cone 28b and respective outer surfaces 182 that engage the inner flange 160 and heal portions 176 and 172 of the top and bottom shoes 166, 164, respectively. In operation, axial movement of the core portion 28 toward the base 34 causes the inner shoes 162 to move radially outwardly, in the direction of arrows B, which in turn causes the bottom shoes 164 and the top shoes 166 to move in the same direction. Upon such movement of shoes 162, 164 and 166, projections 168 and 174 bear against the inner surface 170 of the outer ring 156 at opposite ends thereof to displace outer ring 156 radially outwardly. Simultaneously, shoes 162 bear against the inner flange 160 and the stepped surface 178 bears against flange 154a to displace the inner ring 154 radially outwardly.

Fourth Representative Embodiment

Figure 8:
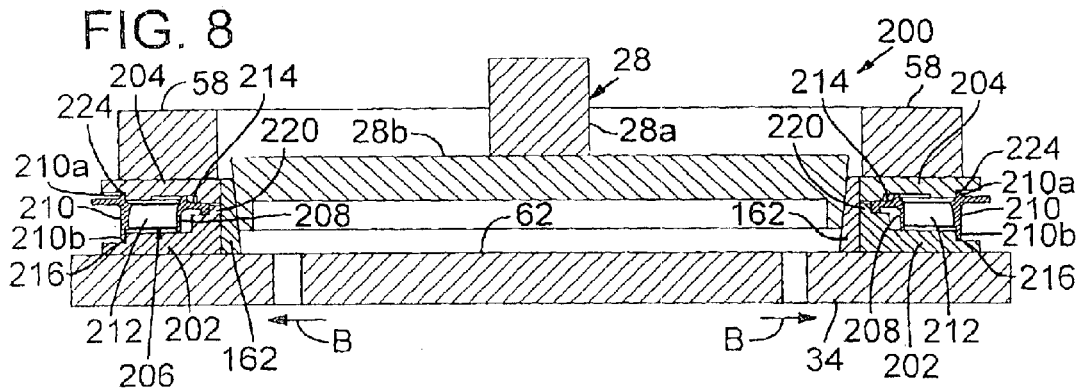
FIG. 8 is a cross-sectional view of another embodiment of an apparatus for sizing a third stator.

An apparatus 200 according to a fourth representative embodiment is illustrated in FIG. 8. Apparatus 200 is similar to apparatus 150 of FIG. 7 in most respects, but has "bottom" shoes 202 and "top" shoes 204 adapted to receive a stator 206. Stator 206 includes an inner ring 208, an outer ring 210, and a plurality of radially extending vanes 212 interconnecting the inner and outer rings 208, 210. An annular inner flange 214 extends radially inwardly from the inner ring 208. The outer ring 210 includes an annular forward extension, or flange, 210a that extends axially from the forward end of the outer ring 210, and an annular aft extension, or flange 210b that extends axially from the aft end of the outer ring 210.

Each bottom shoe 202 includes a stepped surface 216 that engages flange 210b and a heal portion 220 that engages inner flange 214. Each top shoe 204 includes a stepped surface 224 that engages flange 210a. Radial movement of shoes 202 and 204, in the direction of arrows B, cause stepped surfaces 216 and 224 to bear against flanges 210b, 210a, respectively, to displace the outer ring 210, and heal portion 220 to bear against flange 214 to displace the inner ring 208.

Fifth Representative Embodiment

Figure 9:
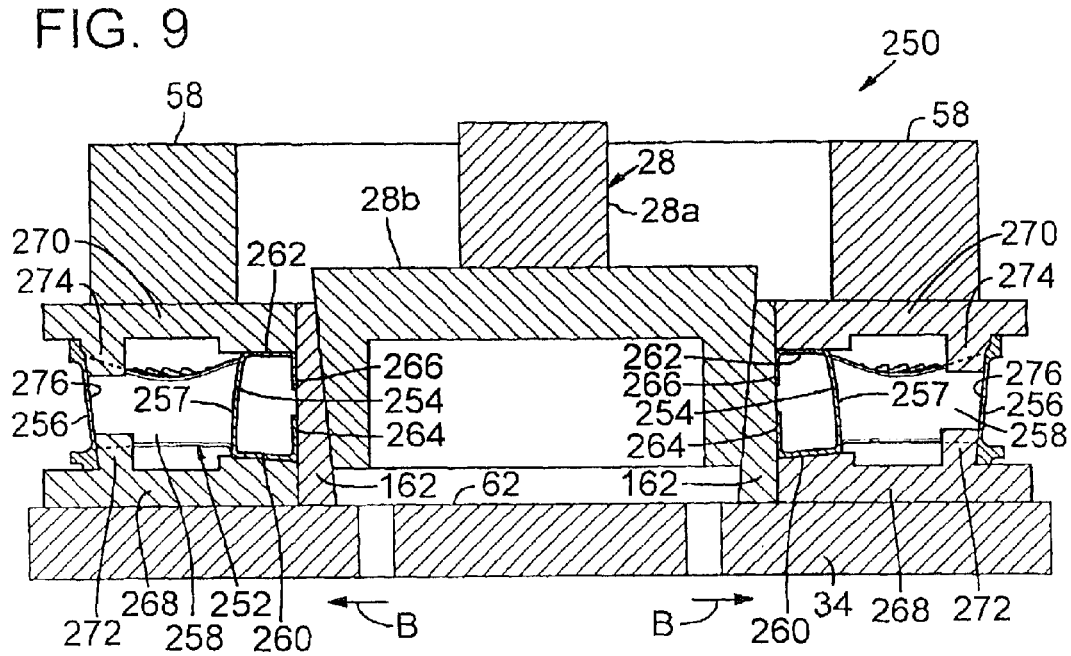
FIG. 9 is a cross-sectional view of another embodiment of an apparatus for sizing a fourth stator.

An apparatus 250 according to a fifth representative embodiment is illustrated in FIG. 9. Apparatus 250 is adapted to size a stator 252 having an inner ring 254, an outer ring 256, and a plurality of radially extending vanes 258 interconnecting the inner and outer rings 254, 256. The inner ring 254 in the depicted configuration has a generally rectangular cross-section, with an outer wall 257, an aft wall 260 and a forward wall 262 extending from respective ends of the outer wall 257. Inner walls 264 and 266 extend from the inner ends of aft wall 260 and forward wall 262, respectively.

Apparatus 250 includes "bottom" shoes 268 and "top" shoes 270. The bottom shoes 268 have a plurality of circumferentially spaced projections 272 adapted to be received between adjacent pairs of vanes 258 for engaging the inner surface 276 of the outer ring 256 at the aft end of stator 252. The top shoes 270 have a plurality of similarly configured, circumferentially spaced projections 274 adapted to be received between adjacent pairs of vanes 258 for engaging the inner surface 276 of the outer ring 256 at the forward end of stator 252. Upon radial movement of shoes 162, 268 and 270, in the direction of arrows B, shoes 162 bear against inner walls 264, 266 to displace the inner ring 254, and projections 272 and 274 simultaneously bear against the inner surface 276 of the outer ring 256 at opposite ends thereof to displace the outer ring 256.

Sixth Representative Embodiment

Figure 10:
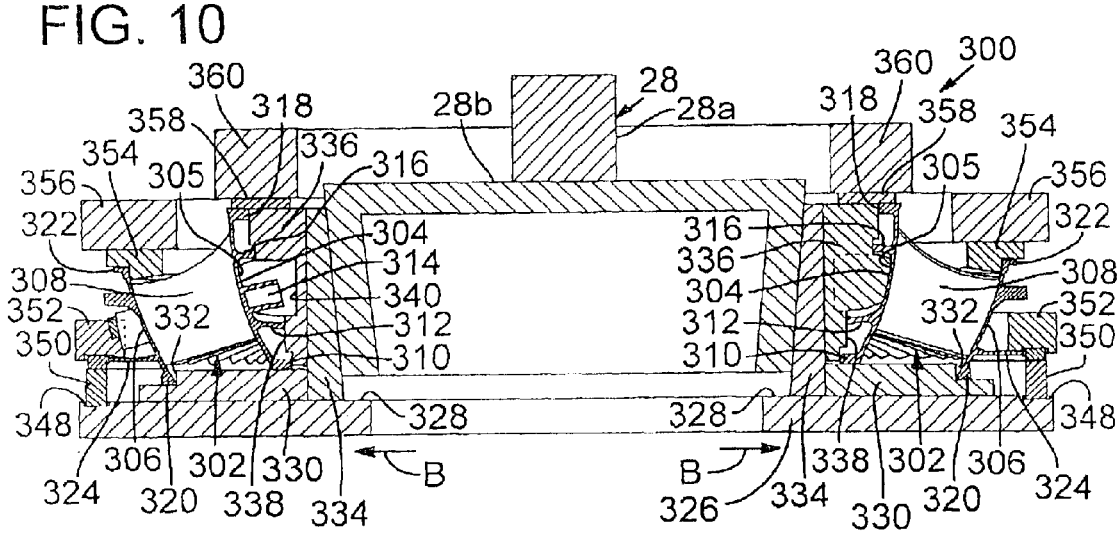
FIG. 10 is a cross-sectional view of another embodiment of an apparatus for sizing a fifth stator.

An apparatus 300 according to a sixth representative embodiment is illustrated in FIG. 10. Apparatus 300 is adapted to size a stator 302 having an inner ring 304, an outer ring 306, and a plurality of radially extending vanes 308 interconnecting the inner and outer rings 304, 306. The inner ring 304 includes a plurality of annular inner fins, or flanges, 310, 312, 316 and 318 that extend radially inwardly from the inner surface 305 of inner ring 304. The inner ring 304 also includes a plurality of projections, or fins, 314 (one of which is shown in FIG. 10) extending generally radially inwardly from the inner surface 305 and circumferentially spaced from each other at various positions along the inner surface 305. The outer ring 306 includes an annular aft flange 320 extending from the aft end of the outer ring 306, an annular forward flange 322 extending from the forward end of the outer ring 306, and an annular outer flange 324 extending radially outwardly from the outer ring 306.

Apparatus 300 includes a base 326 having an upper surface 328 for supporting a plurality of "bottom" shoes 330, which in turn supports the stator 302. The bottom shoes 330 have respective stepped surfaces 332 that engage the aft flange 320 of outer ring 306. A plurality of generally wedge-shaped inner shoes 334 are disposed around a centrally located tapered cone 28b. Another set of shoes 336 are disposed around the inner shoes 334. Each shoe 336 has a stepped outer surface 338 configured to engage flanges 310, 312, 316 and 318 and the inner surface 305 of the inner ring between flanges 312 and 316. Some of the shoes 336 are positioned adjacent a projection 314 of the inner ring 304 (e.g., the shoe 336 on the left-hand side of FIG. 10). Such shoes are formed with a recess 340 that is dimensioned to receive the projection 314.

The base 326 is formed with an annular recess 348, which retains an annular support stand 350 positioned to support the outer flange 324. An annular dead-weight ring 352 is supported on top of the outer flange 324 directly above the support stand 350. The support stand 350 and dead-weight ring 352 serve to minimize deflection or out-of-plane deformation of the outer flange 324 during sizing. Supported on the forward flange 322 of the outer ring 306 is an annular spacer 354, which in turn supports an annular dead-weight ring 356. An annular spacer 358 is partially supported on flange 318 and shoes 336. Spacer 358 supports an annular dead-weight ring 360. Dead-weight rings 356 and 360 assist in avoiding out-of-plane deformation of the stator 302 during sizing.

In operation, axial movement of the core portion 28 toward the base 326 causes the inner shoes 334 to move radially outwardly, in the direction of arrows B, which in turn causes shoes 330 and 336 to move in the same direction. Upon such movement of shoes 330 and 336, stepped surfaces 332 bear against the aft flange 320 to displace the outer ring 306 and shoes 336 simultaneously bear against flanges 310, 312, 316 and 318 and the inner surface 305 to displace the inner ring 304.

Seventh Representative Embodiment

Figure 12:
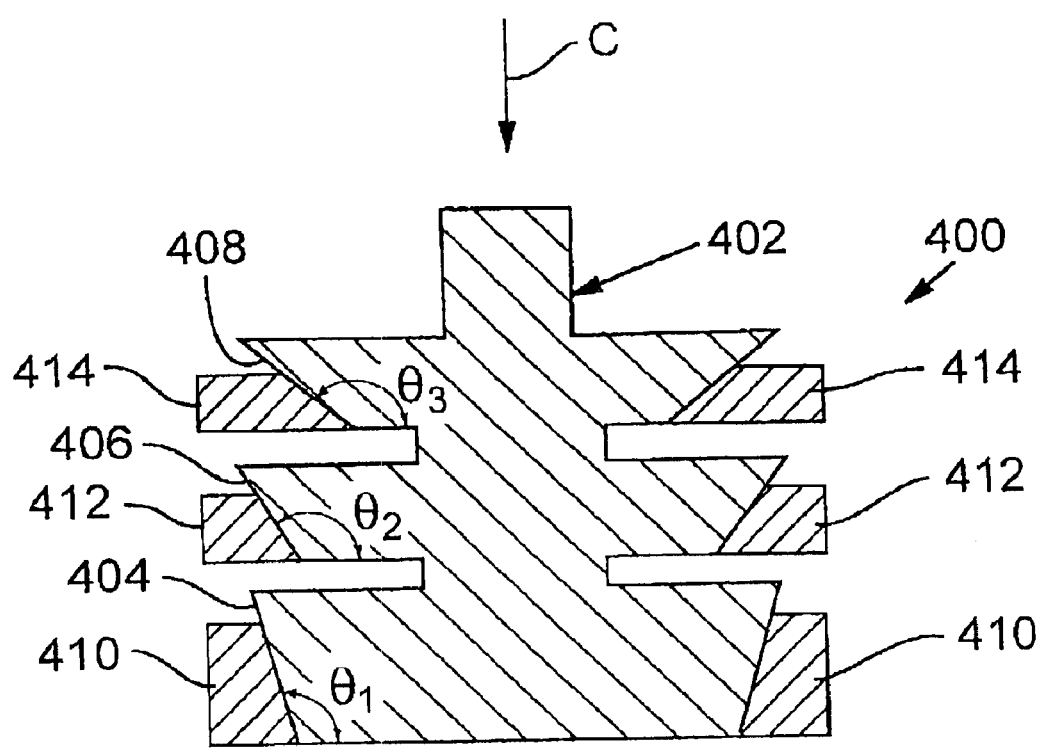
FIG. 12 is a cross-sectional view of another embodiment of an apparatus for sizing a part.

FIG. 12 illustrates another embodiment of an apparatus, indicated generally at 400, for sizing a multi-walled annular part (not shown). In this embodiment, a core portion 402 has a plurality of annular tapered surfaces 404, 406, and 408 having taper angles $\theta_1$, $\theta_2$, and $\theta_3$, respectively. Taper angles $\theta_1$, $\theta_2$, and $\theta_3$, which can be the same of different from each other, are selected to displace respective surfaces of the part at different rates, as further described below. Surrounding the tapered surfaces 404, 406, and 408 are shoes 410, 412, and 414, respectively. Shoes 410, 412, and 414 have inner surfaces that are tapered to correspond to the taper of their associated surface 404, 406, and 408, respectively, of core portion 402. Axial movement of core portion 402 in the direction of arrow C causes shoes 410, 412, and 414 to move radially outwardly.

Shoes 410, 412, and 414 exert a radially outwardly directed force to expand respective annular surfaces (not shown) of the part. In this regard, one or more of shoes 410, 412, and 414 can be configured to directly contact an associated surface of the part (e.g., in the manner of inner shoes 30 of FIG. 2, which directly contact an inner flange 20 of stator 10). Alternatively, one or more of shoes 410, 412, and 414 can be configured to engage a set of respective outer shoes (not shown), which in turn directly contact an associated surface of the part (e.g., in the manner of inner shoes 108 of FIG. 6). In one implementation, for example, shoes 410 can be used to expand an inner wall of the part, shoes 412 can be used to expand an intermediate wall of the part, and shoes 414 can be used to expand an outer wall of the part.

By providing a core portion with more than one tapered surface, the walls of the part can be displaced different distances. In the illustrated embodiment, for example, taper angle $\theta_1$ is less than taper angle $\theta_2$, which is less than taper angle $\theta_3$. Upon axial displacement of core portion 402, shoes 414 are displaced radially outwardly a greater distance, and at a greater rate, than shoes 412, which are displaced radially outwardly a greater distance, and at a greater rate, than shoes 410. Hence, the increase in the diameter of the wall expanded by shoes 414 will be greater than the increase in the diameter of the wall expanded by shoes 412. Similarly, the increase in the diameter of the wall expanded by shoes 412 will be greater than the increase in the diameter of the wall expanded by shoes 410.

In an alternative embodiment, the core portion 402 can be two or more pieces separately movable in the axial direction, rather than the one-piece embodiment of FIG. 12. For example, a core portion can comprise an upper core portion and a separate lower core portion, which can be moveable different distances in the axial direction to effect different displacements to walls of a part.

The present invention has been shown in the described embodiments for illustrative purposes only. The present invention may be subject to many modifications and changes without departing from the spirit or essential characteristics thereof. We therefore claim as our invention all such modifications as come within the spirit and scope of the following claims.

We claim:

1. An apparatus for sizing an article having an inner wall defining a first diameter and at least one outer wall defining a second diameter greater than the first diameter, the apparatus comprising a plurality of wall-engaging segments, at least some of the segments being configured to move generally radially outwardly with respect to the inner and outer walls to engage an inner surface of the inner wall, and at least some of the segments being configured to move generally radially outwardly with respect to the inner and outer walls to engage an inner surface of the at least one outer wall.

2. The apparatus of claim 1, wherein the plurality of wall-engaging segments comprises a first set of wall-engaging segments and a second set of wall-engaging segments spaced axially from the first set of wall engaging segments.

3. The apparatus of claim 2, wherein the segments of the first set are configured to engage the outer wall at a first end of the article and the segments of the second set are configured to engage the inner wall and the outer wall at a second end of the article, the second end being spaced axially from the first end.

4. The apparatus of claim 3, further comprising a plurality of inner shoes positioned radially inwardly of the wall-engaging segments, the inner shoes being moveable radially outwardly to cause the wall-engaging segments to move radially outwardly.

5. The apparatus of claim 1, wherein the plurality of wall-engaging segments comprises a first set of wall-engaging segments and a second set of wall-engaging segments, the first set of wall-engaging segments being positioned radially inwardly of the second set of wall-engaging segments, the segments of the first set configured to engage the inner wall and the segments of the second set configured to engage the outer wall.

6. The apparatus of claim 1, further comprising an elongated core portion, the core portion being movable axially with respect to the article to cause the wall-engaging segments to move generally radially outwardly to engage the inner and outer walls of the article.

7. The apparatus of claims 6, wherein:
the plurality of wall-engaging segments comprises a first set of wall-engaging segments for displacing the inner wall and a second set of wall-engaging segments for displacing the outer wall, the first set of wall-engaging segments being spaced axially from the second set of wall-engaging segments; and
the core portion has a first tapered surface and a second tapered surface positioned axially with respect to the first tapered surface, wherein when the core portion is moved axially with respect to the article, the first tapered surface engages the first set of wall-engaging segments to cause the first set of wall-engaging segments to move radially outwardly to displace the inner wall, and the second tapered surface engages the second set of wall-engaging segments to cause the second set of wall-engaging segments to move radially outwardly to displace the outer wall.

8. The apparatus of claim 6, further comprising a plurality of inner segments positioned around the core portion, the core portion being configured to engage the inner segments such that axial movement of the core portion causes the inner segments to move generally radially outwardly and engage the plurality of wall-engaging segments.

9. The apparatus of claim 8, wherein the inner segments are configured to engage the plurality of wall-engaging segments and the inner wall of the article.

10. The apparatus of claim 8, wherein the inner segments have inner surfaces engageable with the core portion, the inner surfaces coated with a lubricant to minimize friction between the inner surfaces and the core portion.

11. The apparatus of claim 6, further comprising a hydraulic press operable to apply a force to the core portion to cause the core portion to move axially with respect to the article.

12. The apparatus of claim 1, wherein the article has a plurality of vanes extending radially between the inner and outer wall, and said wall-engaging segments configured to engage the outer wall include projections configured to engage the outer wall between adjacent pairs of vanes.

13. The apparatus of claim 1, further comprising a heater for heating the article.

14. The apparatus of claim 13, wherein the heater comprises a source of heated gas for heating the article.

15. The apparatus of claim 14, wherein the heated gas comprises argon.

16. The apparatus of claim 13, wherein the heater comprises one or more heating blankets.

17. The apparatus of claim 13, further comprising insulation substantially surrounding the article to minimize heat loss away from the article.

18. The apparatus of claim 1, wherein the article comprises a stator for a jet engine made from titanium or a titanium alloy.

19. The apparatus of claim 1, further comprising at least one dead weight positioned above the article to minimize out-of-plane deformation of the article when the article is sized.

20. The apparatus of claim 19, wherein the dead weight comprises an annular ring.

21. The apparatus of claim 19, wherein the at least one dead weight comprises a first dead-weight ring supported above the inner wall and a second dead-weight ring supported above the outer wall.

22. An apparatus for sizing a stator having an inner ring, at least one outer ring, and a plurality of vanes extending between the inner and outer rings, the apparatus comprising a plurality of shoes, at least some of which are moveable radially to engage an inner surface of the inner ring and at least some of which are moveable radially to engage an inner surface of the outer ring.

23. The apparatus of claim 22, wherein each shoe of the plurality of shoes are moveable generally radially with respect to the stator to engage the inner ring and outer ring.

24. The apparatus of claim 22, wherein the plurality of shoes comprises a first set of shoes configured to engage an inner surface of the inner ring and a second set of shoes configured to engage an inner surface of the outer ring.

25. The apparatus of claim 24, wherein the first set of shoes are interposed between the stator and a core portion being moveable axially with respect to the stator to engage first set of shoes and cause the first set of shoes to move generally radially outwardly and engage the inner ring and the second set of shoes.

26. The apparatus of claim 22, wherein the plurality of shoes comprises a set of inner shoes, a first set of outer shoes, and a second set of outer shoes spaced axially from the first set of outer shoes, the inner shoes being moveable radially outwardly to engage the first and second sets of outer shoes, thereby causing the first and second sets of outer shoes to move radially outwardly.

27. The apparatus of claim 26, wherein the inner shoes are engageable with the inner ring of the stator.

28. The apparatus of claim 26, wherein the shoes of the first set of outer shoes are engageable with the outer ring at a first end of the stator and the shoes of the second set of outer shoes are engageable with the outer ring at a second end of the stator, the second end being spaced axially from the first end.

29. The apparatus of claim 22, wherein said shoes engageable with the outer ring comprise a plurality of projections extending between adjacent pairs of vanes, the projections engaging the inner surface of the outer ring upon movement of their respective shoes.

30. The apparatus of claim 22, further comprising at least one dead weight, which is placed above the stator for minimizing out-of-plane deformation of the stator as the stator is sized.

31. The apparatus of claim 30, wherein the dead weight comprises an annular ring placed above an annular flange of the stator to prevent deflection of the flange as the stator is sized.

32. A method for sizing an article having an inner wall defining a first diameter and at least one outer wall defining a second diameter greater than the first diameter, the first and second walls centered about an axis, the method comprising moving a plurality of shoes generally radially outwardly with respect to the axis such that at least some of the plurality of shoes engage an inner surface of the inner wall to displace the inner wall and at least some of the plurality of shoes engage an inner surface of the outer wall to displace the outer wall.

33. The method of claim 32, further comprising heating the article prior to displacing the inner and outer walls.

34. The method of claim 33, wherein heating the article comprises heating the article with a heated inert gas.

35. The method of claim 34, wherein the inert gas is argon.

36. The method of claim 33, wherein the article is made from titanium or a titanium alloy and the article is heated to at least 1,500° F.

37. The method of claim 32, comprising moving a centrally disposed core along the axis, thereby causing the plurality of shoes to move generally radially with respect to the axis.

38. The method of claim 32, comprising moving the plurality of shoes radially outwardly such that the inner wall and outer wall are displaced at different rates in the radial direction.

39. The method of claim 32, comprising moving the plurality of shoes radially outwardly such that the inner wall and outer wall are displaced at different rates in the radial direction.

40. A method for sizing an article having a first ring defining a first diameter and a second ring defining a second diameter greater than the first diameter, and a plurality of circumferentially spaced vanes extending between the first and second rings, the first and second rings being centered about an axis, the method comprising displacing the first and second rings generally radially with respect to the axis so as to increase the respective diameters of the first and second rings.

41. The method of claim 40, further comprising heating the article prior to displacing the first and second rings.

42. The method of claim 41, comprising heating the article with either heated argon gas or at least one heating blanket, and insulating the article to minimize heat loss from the article.

43. The method of claim 40, comprising displacing the first and second rings simultaneously.

44. The method of claim 40, wherein displacing the first and second rings comprises moving a plurality of shoes generally radially outwardly with respect to the axis such that at least some of the plurality of shoes engage an inner surface of the first ring and displace the first ring and at least some of the plurality of shoes engage an inner surface of the second ring and displace the second ring.

45. The method of claim 44, comprising moving a centrally located tapered cone along the axis, movement of the cone causing the plurality of shoes to move generally radially outwardly with respect to the cone to displace the first and second rings.

46. The method of claim 44, wherein at least some of the plurality of shoes engage the inner surface of the second ring between adjacent pairs of vanes.

47. The method of claim 44, wherein at least some of the plurality of shoes engage a flange of the first ring to displace the first ring.

48. The method of claim 40, wherein displacing the first and second rings comprises moving a first set of shoes generally radially with respect to the axis to engage a first end of the second ring and simultaneously moving a second set of shoes generally radially with respect to the axis to engage a second end of the second ring, the movement of the first and second set of shoes causing the second ring to increase in diameter.

49. The method of claim 48, wherein the first set of shoes are engageable with the second ring and first ring such that movement of the first and second set of shoes causes both the first and second rings to simultaneously increase in diameter.

50. The method of claim 49, further comprising moving a set of inner shoes generally radially with respect to the axis to engage the first and second set of shoes, thereby causing the first and second set of shoes to move radially with respect to the axis to engage the first and second rings.

51. The method of claim 48, further comprising moving a third set of shoes generally radially with respect to the axis to engage the first ring, thereby causing the first ring to increase in diameter.

52. The method of claim 40, wherein the first ring is displaced the same distance as the second ring.

53. The method of claim 40, wherein the first ring is displaced a first distance and the second ring is displaced a second distance different than the first distance.

54. The method of claim 53, wherein the second ring is displaced a greater distance than the first ring.

55. A shoe, for sizing an annular article having an inner wall defining a first diameter and at least one outer wall defining a second diameter greater than the first diameter, the article having a plurality of vanes extending radially between the inner and outer wall, the shoe being configured to engage an inner surface of the inner wall and an inner surface of the outer wall and further comprising projections configured to engage an inner surface of the outer wall between adjacent pairs of vanes.

56. A shoe for sizing a stator having an inner ring, at least one outer ring, and a plurality of vanes extending between the inner and outer rings, the shoe comprising a plurality of projections configured to engage the outer ring between adjacent pairs of vanes.

57. The shoe of claim 56 further comprising a heal portion configured to engage an inner surface of the inner ring.

58. Plural shoes, for sizing an annular article having an inner wall defining a first diameter and at least one outer wall defining a second diameter greater than the first diameter, comprising:
- a first shoe configured to engage an inner surface of the inner wall; and
- a second shoe configured to engage an inner surface of the outer wall, the second shoe comprising a plurality of circumferentially-spaced projections for engaging the outer wall and the first shoe comprising a heal portion for engaging the inner wall.

59. A cast article having an inner wall defining a first diameter and at least one outer wall defining a second diameter greater than the first diameter, the first and second walls centered about an axis, the article formed by a method comprising:
- moving a plurality of wall-engaging segments generally radially outwardly with respect to the axis such that at least some of the plurality of wall-engaging segments engage an inner surface of the inner wall to expand the inner wall and at least some of the plurality of wall-engaging segments engage an inner surface of the outer wall to expand the outer wall;
- wherein the respective diameters of the inner and outer walls after expansion are equal to or substantially equal to specified diameters within a tolerance of less than two hundredths of an inch.

60. The article of claim 59, wherein the article is made of titanium or a titanium alloy.

61. The article of claim 59, wherein the article has a plurality of circumferentially-spaced radial members extending generally radially between the inner and outer walls.

62. The article of claim 59, wherein the method further comprises heating the article.

63. The article of claim 59, wherein the step of moving a plurality of wall-engaging segments comprises moving a first stet of wall-engaging segments generally radially with respect to the axis to engage a first end of the outer wall and simultaneously moving a second set of wall-engaging segments generally radially with respect to the axis to engage a second end of the outer wall to cause the outer wall to increase in diameter.

64. The article of claim 63, wherein the first set of wall-engaging segments are engageable with both the inner wall and outer wall such that movement of the first and second sets of wall-engaging segments causes both the inner and outer walls to increase in diameter.

65. The article of claim 63, wherein the method further comprises moving a plurality of inner shoes generally radially with respect to the axis to engage the first and second set of wall-engagement segments, thereby causing the first and second set of wall-engaging segments to move generally radially with respect to the axis.

66. A cast article having a first ring defining a first diameter and a second ring defining a second diameter greater than the first diameter, the first and second rings centered about an axis, and a plurality of vanes extending between the first and second rings, the article being formed by a method comprising:
- simultaneously displacing the first and second rings generally radially with respect to the axis so as to increase the respective diameters of the first and second rings;
- wherein the respective diameters of the first and second rings after being displaced are equal to or substantially equal to specified diameters within a tolerance of less than two hundredths of an inch.

67. The article of claim 66, wherein the article is made of titanium or a titanium alloy.

68. The article of claim 66, wherein the step of displacing the first and second rings comprises applying a radially directed force to the inner surfaces of the first and second rings to cause the first and second rings to expand.

69. A system for sizing an article, the article defining a central axis and having an inner wall defining a first diameter and at least one outer wall defining a second diameter greater than the first diameter, the apparatus comprising:
- a tapered cone being moveable along the central axis;
- a plurality of inner shoes positioned in a circumferential manner to define a central space for receiving the cone, each shoe having an inner surface and outer surface, the inner surfaces of the shoes being shaped to correspond to the tapered cone such that movement of the cone in the axial direction causes the shoes to move radially outwardly with respect to the central axis;
- a first set of a plurality of outer shoes positioned radially outwardly from the inner shoes, the first set of outer shoes configured to engage the inner surface of the outer wall at a first end of the outer wall;
- a second set of a plurality of outer shoes positioned radially outwardly from the inner shoes and spaced axially from the first set of outer shoes, the second set of outer shoes configured to engage the inner surface of the outer wall at a second end of the outer wall, the second end being spaced axially from the first end;
- at least one annular dead-weight ring supported above the article to minimize out-of-plane deflection of the article as the article is being sized;
- at least one heater for heating the stator, the heater comprising at least one of a heating blanket and a source of heated gas; and a press operable to apply a force to the tapered cone to move the tapered cone along the central axis to engage the inner shoes and size the article.

* * * * *

UNITED STATES PATENT AND TRADEMARK OFFICE
CERTIFICATE OF CORRECTION

PATENT NO. : 6,910,859 B2
DATED : June 28, 2005
INVENTOR(S) : Bluhm et al.

It is certified that error appears in the above-identified patent and that said Letters Patent is hereby corrected as shown below:

Column 5,
Line 58, "use" should be -- used --.

Column 7,
Line 1, "to limiting" should be -- to be limiting --.

Column 8,
Lines 10 and 13, "heal" should be -- heel --.
Line 17, "projections 104" should be -- projections 106 --.

Column 10,
Line 60, "same of different" should be -- same or different -- .

Column 11,
Line 58, "wall engaging" should be -- wall-engaging --.

Column 12,
Line 15, "of claims 6" should be -- of claim 6 --.

Column 14,
Line 5, "38. The method of claim 32, comprising moving the plurality of shoes radially outwardly such that the inner wall and outer wall are displaced at different rates in the radial direction." should be -- 38. The method of claim 32, comprising moving the plurality of shoes radially outwardly such that the inner wall and outer wall are displaced the same distance in the radial direction. --.

UNITED STATES PATENT AND TRADEMARK OFFICE
CERTIFICATE OF CORRECTION

PATENT NO. : 6,910,859 B2
DATED : June 28, 2005
INVENTOR(S) : Bluhm et al.

It is certified that error appears in the above-identified patent and that said Letters Patent is hereby corrected as shown below:

Column 15,
Lines 11 and 30, "heal" should be -- heel --.
Line 21, "shoes, for" should be -- shoes for --.

Signed and Sealed this

Fifteenth Day of November, 2005

JON W. DUDAS
*Director of the United States Patent and Trademark Office*